United States Patent
Xu et al.

(10) Patent No.: US 9,900,849 B2
(45) Date of Patent: Feb. 20, 2018

(54) SRS OPTIMIZATION FOR COORDINATED MULTI-POINT TRANSMISSION AND RECEPTION

(71) Applicant: QUALCOMM Incorporated, San Diego, CA (US)

(72) Inventors: Hao Xu, San Diego, CA (US); Juan Montojo, Nuremberg (DE); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 13/633,667

(22) Filed: Oct. 2, 2012

(65) Prior Publication Data

US 2013/0083729 A1 Apr. 4, 2013

Related U.S. Application Data

(60) Provisional application No. 61/542,669, filed on Oct. 3, 2011.

(51) Int. Cl.
*H04W 52/32* (2009.01)
*H04W 52/12* (2009.01)
*H04W 52/14* (2009.01)

(52) U.S. Cl.
CPC .......... *H04W 52/325* (2013.01); *H04W 52/12* (2013.01); *H04W 52/146* (2013.01)

(58) Field of Classification Search
None
See application file for complete search history.

(56) References Cited

U.S. PATENT DOCUMENTS

| 8,923,905 | B2 | 12/2014 | Montojo et al. | |
|---|---|---|---|---|
| 2008/0045259 | A1* | 2/2008 | Shen et al. | 455/522 |
| 2008/0045260 | A1 | 2/2008 | Muharemovic et al. | |
| 2009/0046645 | A1 | 2/2009 | Bertrand et al. | |
| 2009/0073955 | A1* | 3/2009 | Malladi | 370/349 |

(Continued)

FOREIGN PATENT DOCUMENTS

| CN | 102696264 A | 9/2012 |
|---|---|---|
| JP | 2010520711 A | 6/2010 |

(Continued)

OTHER PUBLICATIONS

Ericsson et al., "On the details of dynamic aperiodic SRS", 3Gpp DRAFT; R1-104853, 3rd Generation Partnership Project (3GPP), Moblie Competence Centre; 650, Route Des Lucioles; F-06921 Sophia-Antipolis Cedex ; France vol. RAN WG1, no. Madrid, Spain; Aug. 23, 2010, Aug. 17, 2010 (Aug. 17, 2010), XP050450027, [retrieved on Aug. 17, 2010].

(Continued)

*Primary Examiner* — Peter Chau
(74) *Attorney, Agent, or Firm* — Patterson & Sheridan, LLP

(57) ABSTRACT

Certain aspects of the present disclosure relate to techniques for power control and SRS multiplexing for coordinated multi-point (CoMP) transmission and reception in heterogeneous networks (HetNet). Multiple SRS processes are supported with different physical and/or virtual cell ID. Different power control offsets and processes are associated with the different SRS processes.

38 Claims, 13 Drawing Sheets

(56) References Cited

U.S. PATENT DOCUMENTS

| | | | |
|---|---|---|---|
| 2010/0103867 A1* | 4/2010 | Kishiyama et al. | 370/320 |
| 2010/0246561 A1 | 9/2010 | Shin et al. | |
| 2010/0285810 A1* | 11/2010 | Ko et al. | 455/450 |
| 2011/0098054 A1 | 4/2011 | Gorokhov et al. | |
| 2011/0105059 A1* | 5/2011 | Gaal et al. | 455/127.1 |
| 2011/0199944 A1* | 8/2011 | Chen et al. | 370/280 |
| 2011/0261716 A1 | 10/2011 | Kim et al. | |
| 2011/0294529 A1 | 12/2011 | Luo et al. | |
| 2012/0051265 A1 | 3/2012 | Shen et al. | |
| 2012/0093119 A1 | 4/2012 | Kim et al. | |
| 2012/0213189 A1* | 8/2012 | Choi et al. | 370/329 |
| 2013/0077571 A1* | 3/2013 | Papasakellariou et al. | 370/328 |
| 2013/0121279 A1* | 5/2013 | Noh et al. | 370/329 |
| 2013/0143617 A1* | 6/2013 | Cea et al. | 455/522 |
| 2014/0219152 A1* | 8/2014 | Anto et al. | 370/311 |

FOREIGN PATENT DOCUMENTS

| | | | |
|---|---|---|---|
| KR | 20100118534 A | 11/2010 | |
| KR | 20120101334 A | 9/2012 | |
| TW | 201128992 A | 8/2011 | |
| WO | 2011041598 A2 | 4/2011 | |
| WO | 2011083706 A1 | 7/2011 | |
| WO | 2012023885 A1 | 2/2012 | |

OTHER PUBLICATIONS

International Search Report and Written Opinion—PCT/IB2012/001991—ISA/EPO—dated Feb. 5, 2013.
International Search Report and Written Opinion—PCT/US2012/059124—ISA/EPO—dated May 6, 2013.
LG Electronics, "Enhancement of SRS power control for CoMP", 3GPP TSG RAN WG1 Meeting #69, R1-122302, May 25, 2012, 7 pages.
Alcatel-Lucent, Alcatel-Lucent Shanghai Bell : "UL SRS enhancements to support CoMP and Transmit Diversity," 3GPP TSG-RAN WG1 #59bis R1-100434. Jan. 12, 2010, URL, http://www.3gpp.org/ftp/tsg_ran/WG1_RL1/TSGR1_59b/Docs/R1-100434.zip, 3 pages.
ASUSTeK, "SRS power control for CoMP", 3GPP TSG RAN WG1 Meeting #70 R1-123713, Aug. 5, 2012.
Fujitsu, "Discussion on SRS Power Control", 3GPP TSG RAN WG1 Meeting #70 R1-123302, Aug. 5, 2012.
Fujitsu, "Enhancement of Power Control for SRS and Uplink Channels", 3GPP TSG RAN WG1 Meeting #68bis R1-121506, Mar. 20, 2012.
NTT DOCOMO: "CoMP with Lower Tx Power RRH in Heterogeneous Network", 3GPP Draft; R1-110867 Comp in Hetnet, 3rd Generation Partnership Project (3GPP), Mobile Competence Centre; 650, Route Des Lucioles; F-06921 Sophi A-Antipolis Cedex; France, vol. RAN WG1, No. Taipei, Taiwan; 20110221, pp. 1-8, XP050490635, Feb. 15, 2011 (Feb. 15, 2011).
Pantech, "Consideration points for SRS power control", 3GPP TSG RAN1 #68bis R1-121363, Mar. 20, 2012.
QUALCOMM Incorporated: "SRS Power Control", 3GPP Draft; R1-123693 SRS Power Control, 3rd Generation Partnership Project (3GPP), Mobile Competence Centre; 650, Route Des Lucioles; F-06921 Sophia-Antipolis Cedex; France vol. RAN WG1, No. Qingdao, China; 20120813-20120817, Aug. 5, 2012 (Aug. 5, 2012), XP050661567, Retrieved from the Internet: URL:http:jjwww.3gpp.orgjftpjtsgran/WG1 RL1/TSGR1 70/Docsj --[retrieved on Aug. 5, 2012] paragraphs [0003]. [03 .1]. [03. 2].

* cited by examiner

Table 1 SRPI of Macro eNB

| Index | 0 | 1 | 2 | 3 | 4 | 5 | 6 | 7 |
|---|---|---|---|---|---|---|---|---|
| SRPI value | X | X | X | U | X | X | X | N |

Table 2 SRPI of Femto eNB

| Index | 0 | 1 | 2 | 3 | 4 | 5 | 6 | 7 |
|---|---|---|---|---|---|---|---|---|
| SRPI value | X | X | X | N | X | X | X | U |

FIG. 5

SRS OPTIMIZATION FOR COORDINATED MULTI-POINT TRANSMISSION AND RECEPTION

CLAIM OF PRIORITY UNDER 35 U.S.C. §119

The present Application for Patent claims priority to U.S. Provisional Application No. 61/542,669, entitled "SRS OPTIMIZATION FOR COORDINATED MULTI-POINT TRANSMISSION AND RECEPTION," filed Oct. 3, 2011, and assigned to the assignee hereof and hereby expressly incorporated by reference herein.

BACKGROUND

I. Field

Certain aspects of the disclosure generally relate to wireless communications and, more particularly, to techniques for power control and user multiplexing for coordinated multi-point (CoMP) transmission and reception in heterogeneous networks (HetNet).

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations (BS) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure provide a method for wireless communication by a user equipment (UE). The method generally comprises transmitting a first sounding reference signal (SRS) intended for a first one or more base stations currently serving the UE and associated with a first cell identifier, transmitting a second SRS intended for a second one or more base stations associated with a second cell identifier and adjusting the transmission power of first and second SRS with separate power control schemes.

Certain aspects of the present disclosure provide a method for wireless communication by a base station (BS). The method generally includes configuring a user equipment (UE) to transmit a first sounding reference signal (SRS) intended for a first one or more base stations currently serving the UE and associated with a first cell identifier, configuring the UE to transmit a second SRS intended for a second one or more base stations associated with a second cell identifier, and sending one or more transmit power control (TPC) commands for the UE to adjust the transmission power of first and second SRS with separate power control schemes.

Certain aspects of the present disclosure provide an apparatus for wireless communication by a user equipment (UE). The apparatus generally includes at least one processor configured to transmit a first sounding reference signal (SRS) intended for a first one or more base stations currently serving the UE and associated with a first cell identifier, transmit a second SRS intended for a second one or more base stations associated with a second cell identifier, and adjust the transmission power of first and second SRS with separate power control schemes; and a memory coupled with the at least one processor.

Certain aspects of the present disclosure provide an apparatus for wireless communication by a first base station. The apparatus generally includes at least one processor configured to configure a user equipment (UE) to transmit a first sounding reference signal (SRS) intended for a first one or more base stations currently serving the UE and associated with a first cell identifier, configure the UE to transmit a second SRS intended for a second one or more base stations associated with a second cell identifier, and send one or more transmit power control (TPC) commands for the UE to adjust the transmission power of first and second SRS with separate power control schemes; and a memory coupled with the at least one processor.

Certain aspects of the present disclosure provide a computer program product comprising a computer readable medium having instructions stored thereon. The instructions are generally executable by one or more processors for transmitting a first sounding reference signal (SRS) intended for a first one or more base stations currently serving a UE and associated with a first cell identifier, transmitting a second SRS intended for a second one or more base stations associated with a second cell identifier, and adjusting the transmission power of first and second SRS with separate power control schemes.

Certain aspects of the present disclosure provide a computer program product comprising a computer readable medium having instructions stored thereon. The instructions are generally executable by one or more processors for configuring a user equipment (UE) to transmit a first sounding reference signal (SRS) intended for a first one or more base stations currently serving the UE and associated with a first cell identifier, configuring the UE to transmit a second SRS intended for a second one or more base stations associated with a second cell identifier, and sending one or more transmit power control (TPC) commands for the UE to adjust the transmission power of first and second SRS with separate power control schemes.

BRIEF DESCRIPTION OF THE DRAWINGS

FIG. 5 illustrates example resource partitioning in a heterogeneous network in accordance with certain aspects of the present disclosure.

DETAILED DESCRIPTION

Aspects of the present disclosure provide techniques that may enhance sounding reference signal (SRS) procedures for use in coordinated multipoint (CoMP) systems. As will be described in greater detail below, a UE involved in CoMP operations may be configured to send two different sets of SRS signals. For example, a first set of SRS may be intended for a serving cell only, while the second set of SRS may be intended for the joint reception of multiple cells.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
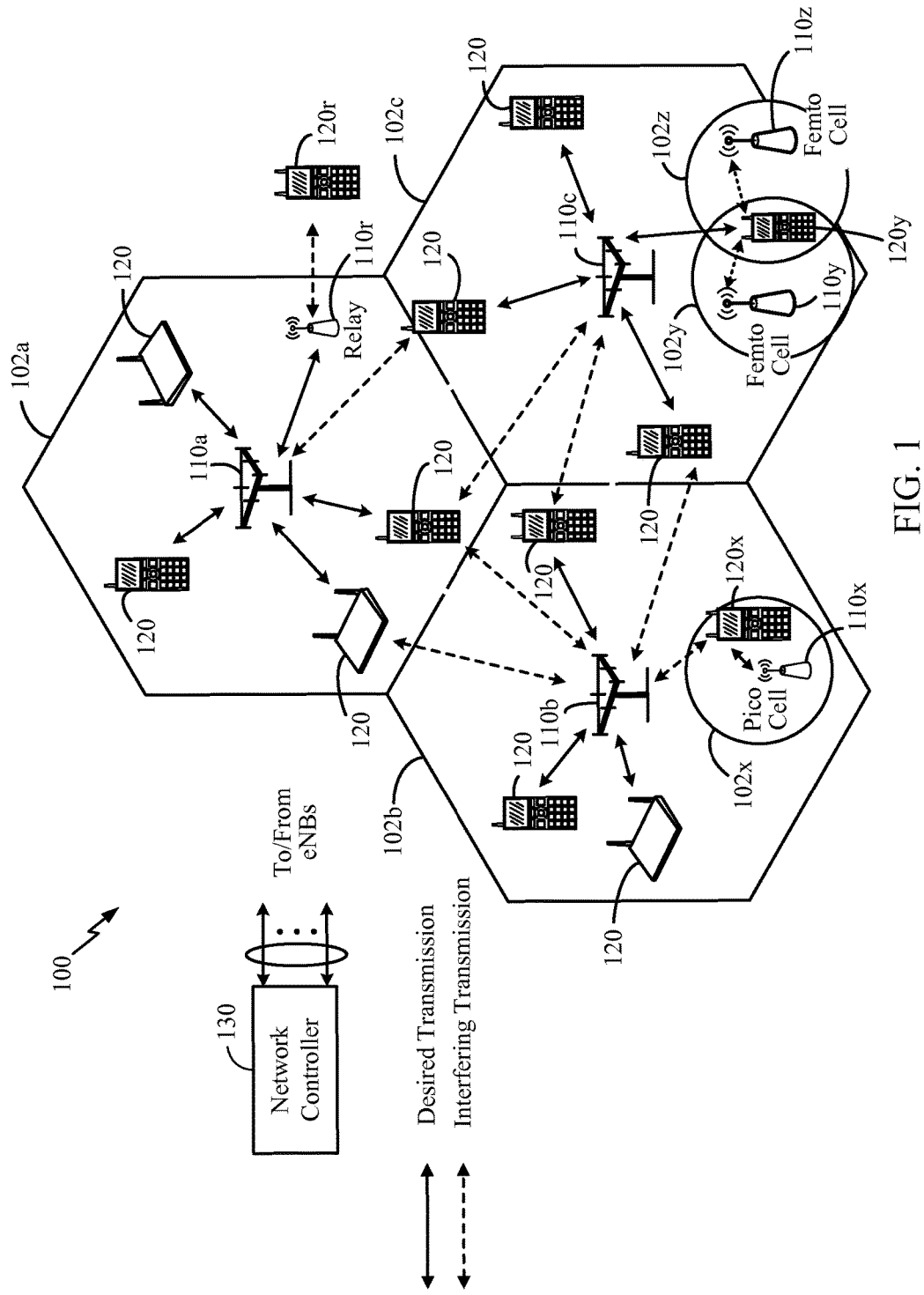
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
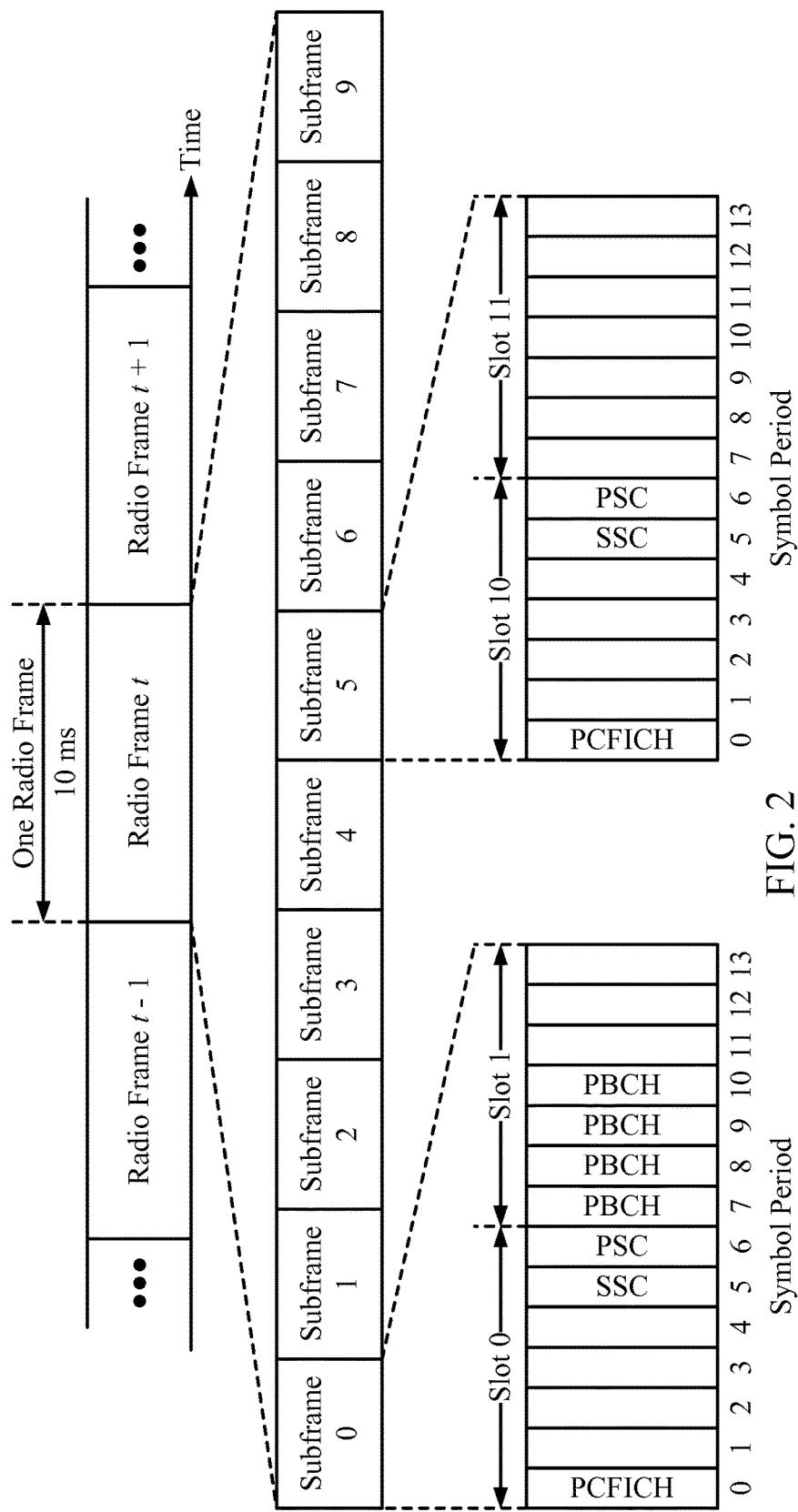
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
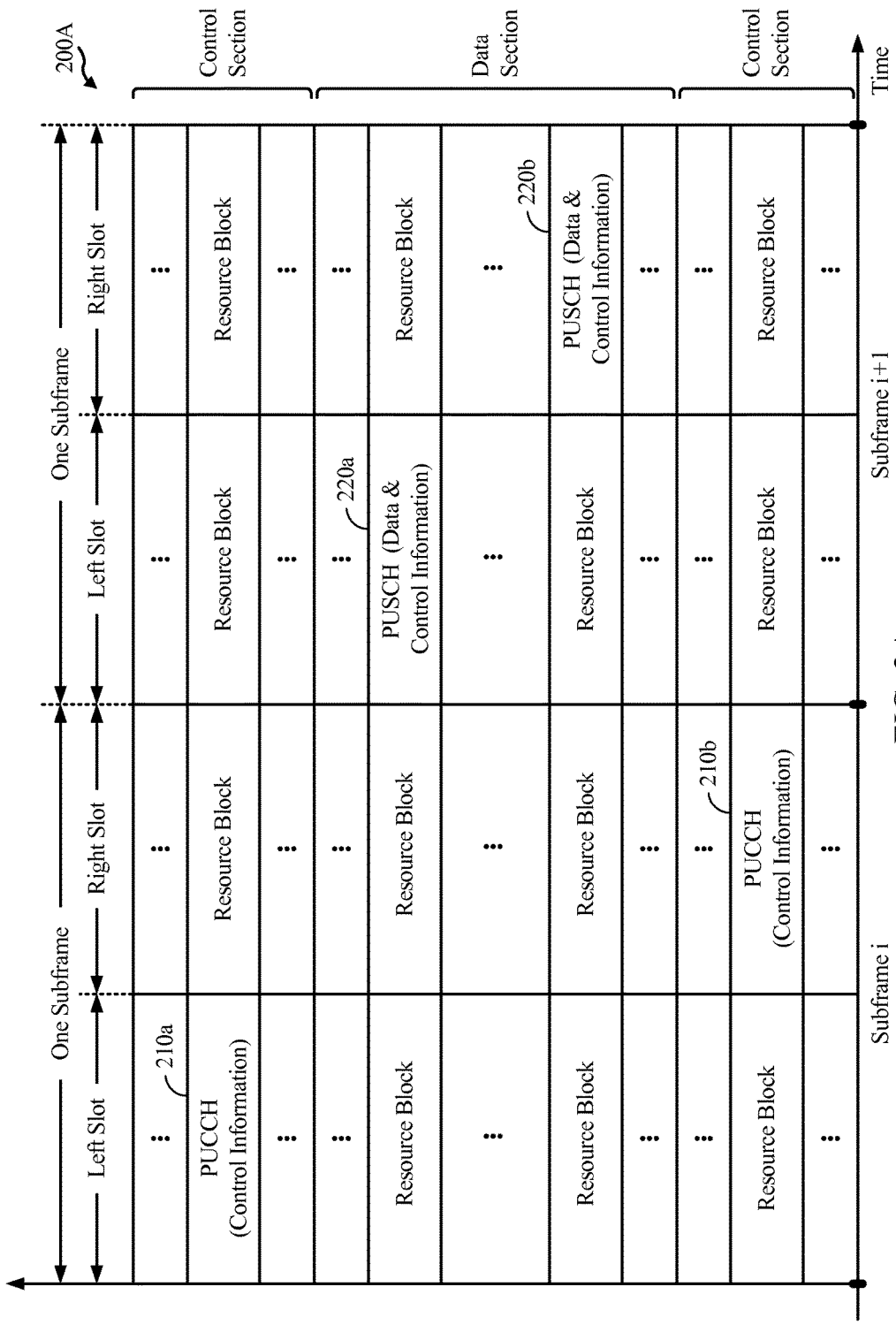
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
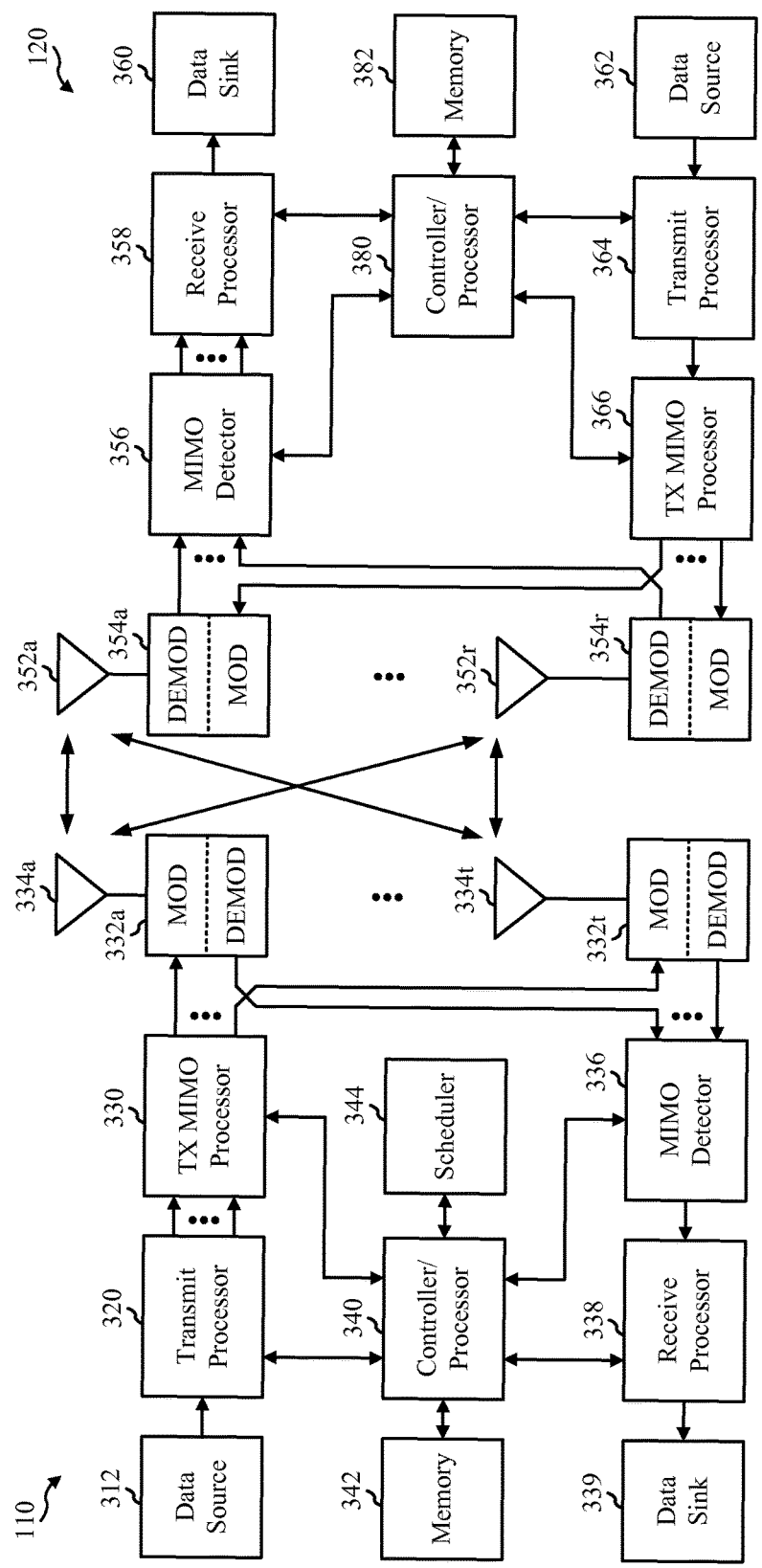
FIG. 3 shows a block diagram conceptually illustrating an example of a Node B in communication with a user equipment device (UE) in a wireless communications network in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors and modules at the eNB 110 may perform or direct operations and/or processes for the techniques described herein. The memories 342 and 382 may store data and program codes for the eNB 110 and the UE 120, respectively. A scheduler 344 may schedule UEs for data transmission on the downlink and/or uplink.

Example Resource Partitioning

According to certain aspects of the present disclosure, when a network supports enhanced inter-cell interference coordination (eICIC), the base stations may negotiate with each other to coordinate resources in order to reduce or eliminate interference by the interfering cell giving up part of its resources. In accordance with this interference coordination, a UE may be able to access a serving cell even with severe interference by using resources yielded by the interfering cell.

For example, a femto cell with a closed access mode (i.e., in which only a member femto UE can access the cell) in the coverage area of an open macro cell may be able to create a "coverage hole" (in the femto cell's coverage area) for a macro cell by yielding resources and effectively removing interference. By negotiating for a femto cell to yield resources, the macro UE under the femto cell coverage area may still be able to access the UE's serving macro cell using these yielded resources.

In a radio access system using OFDM, such as Evolved Universal Terrestrial Radio Access Network (E-UTRAN), the yielded resources may be time based, frequency based, or a combination of both. When the coordinated resource partitioning is time based, the interfering cell may simply not use some of the subframes in the time domain. When the coordinated resource partitioning is frequency based, the interfering cell may yield subcarriers in the frequency domain. With a combination of both frequency and time, the interfering cell may yield frequency and time resources.

Figure 4:
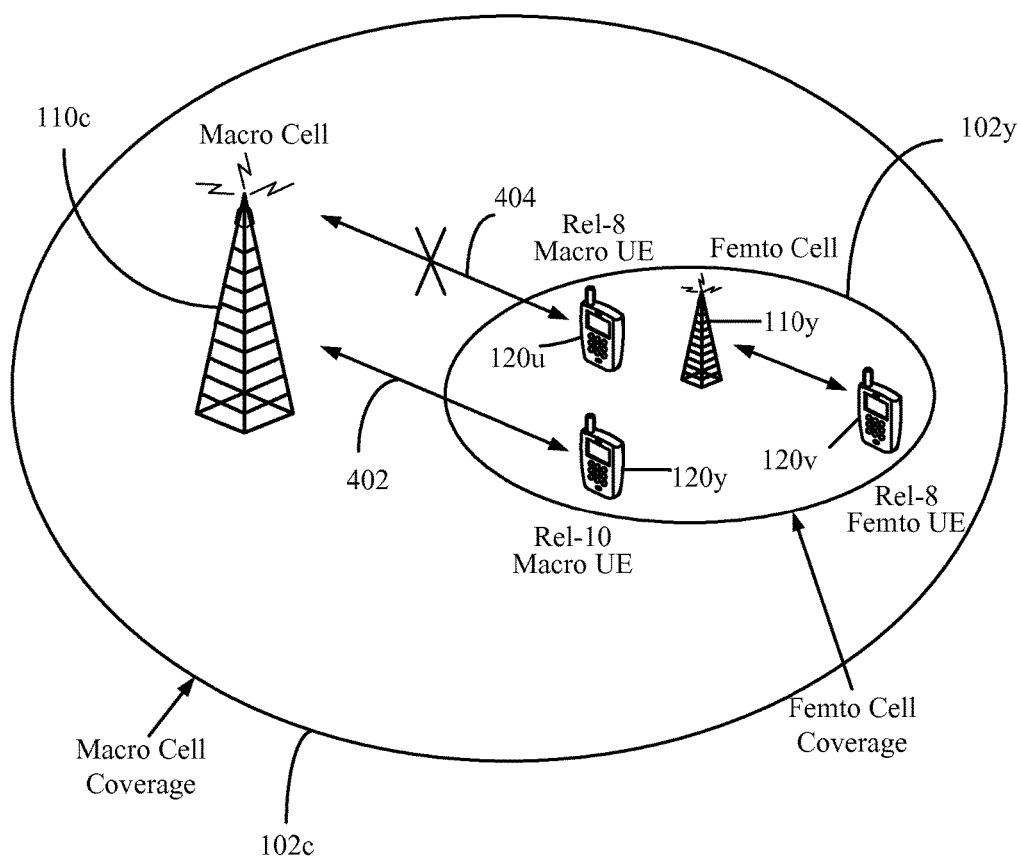
FIG. 4 illustrates an example heterogeneous network (HetNet) in accordance with certain aspects of the present disclosure.

FIG. 4 illustrates an example scenario where eICIC may allow a macro UE $120y$ supporting eICIC (e.g., a Rel-10 macro UE as shown in FIG. 4) to access the macro cell $110c$ even when the macro UE $120y$ is experiencing severe interference from the femto cell y, as illustrated by the solid radio link $402$. A legacy macro UE $120u$ (e.g., a Rel-8 macro UE as shown in FIG. 4) may not be able to access the macro cell $110c$ under severe interference from the femto cell $110y$, as illustrated by the broken radio link $404$. A femto UE $120v$ (e.g., a Rel-8 femto UE as shown in FIG. 4) may access the femto cell $110y$ without any interference problems from the macro cell $110c$.

According to certain aspects, networks may support eICIC, where there may be different sets of partitioning information. A first of these sets may be referred to as Semi-static Resource Partitioning Information (SRPI). A second of these sets may be referred to as Adaptive Resource Partitioning Information (ARPI). As the name implies, SRPI typically does not change frequently, and SRPI may be sent to a UE so that the UE can use the resource partitioning information for the UE's own operations.

As an example, the resource partitioning may be implemented with 8 ms periodicity (8 subframes) or 40 ms periodicity (40 subframes). According to certain aspects, it may be assumed that frequency division duplexing (FDD) may also be applied such that frequency resources may also be partitioned. For communications via the downlink (e.g., from a cell node B to a UE), a partitioning pattern may be mapped to a known subframe (e.g., a first subframe of each radio frame that has a system frame number (SFN) value that is a multiple of an integer N, such as 4). Such a mapping may be applied in order to determine resource partitioning information (RPI) for a specific subframe. As an example, a subframe that is subject to coordinated resource partitioning (e.g., yielded by an interfering cell) for the downlink may be identified by an index:

$$IndexSRPI\_DL=(SFN*10+subframe\ number) mod\ 8$$

For the uplink, the SRPI mapping may be shifted, for example, by 4 ms. Thus, an example for the uplink may be:

$$IndexSRPI\_UL=(SFN*10+subframe\ number+4) mod\ 8$$

SRPI may use the following three values for each entry:

U (Use): this value indicates the subframe has been cleaned up from the dominant interference to be used by this cell (i.e., the main interfering cells do not use this subframe);

N (No Use): this value indicates the subframe shall not be used; and

X (Unknown): this value indicates the subframe is not statically partitioned. Details of resource usage negotiation between base stations are not known to the UE.

Another possible set of parameters for SRPI may be the following:

U (Use): this value indicates the subframe has been cleaned up from the dominant interference to be used by this cell (i.e., the main interfering cells do not use this subframe);

N (No Use): this value indicates the subframe shall not be used;

X (Unknown): this value indicates the subframe is not statically partitioned (and details of resource usage negotiation between base stations are not known to the UE); and C (Common): this value may indicate all cells may use this subframe without resource partitioning. This subframe may be subject to interference, so that the base station may choose to use this subframe only for a UE that is not experiencing severe interference.

The serving cell's SRPI may be broadcasted over the air. In E-UTRAN, the SRPI of the serving cell may be sent in a master information block (MIB), or one of the system information blocks (SIBs). A predefined SRPI may be defined based on the characteristics of cells, e.g. macro cell, pico cell (with open access), and femto cell (with closed access). In such a case, encoding of SRPI in the system overhead message may result in more efficient broadcasting over the air.

The base station may also broadcast the neighbor cell's SRPI in one of the SIBs. For this, SRPI may be sent with its corresponding range of physical cell identifiers (PCIs).

ARPI may represent further resource partitioning information with the detailed information for the 'X' subframes in SRPI. As noted above, detailed information for the 'X' subframes is typically only known to the base stations, and a UE does not know it.

Figure 6:
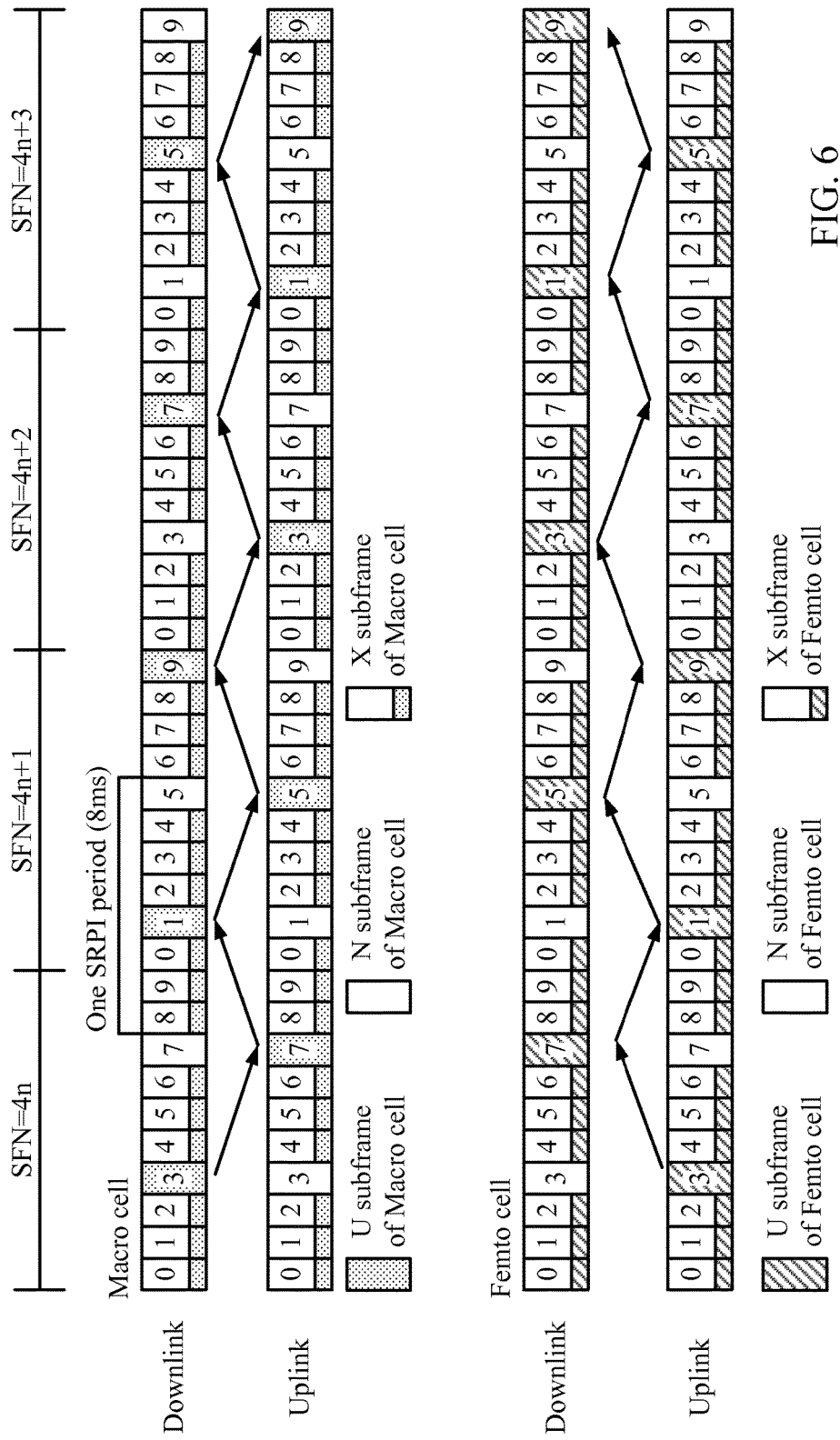
FIG. 6 illustrates example cooperative partitioning of subframes in a heterogeneous network in accordance with certain aspects of the present disclosure.

FIGS. 5 and 6 illustrate examples of SRPI assignment in the scenario with macro and femto cells. A U, N, X, or C subframe is a subframe corresponding to a U, N, X, or C SRPI assignment.

Figure 7:
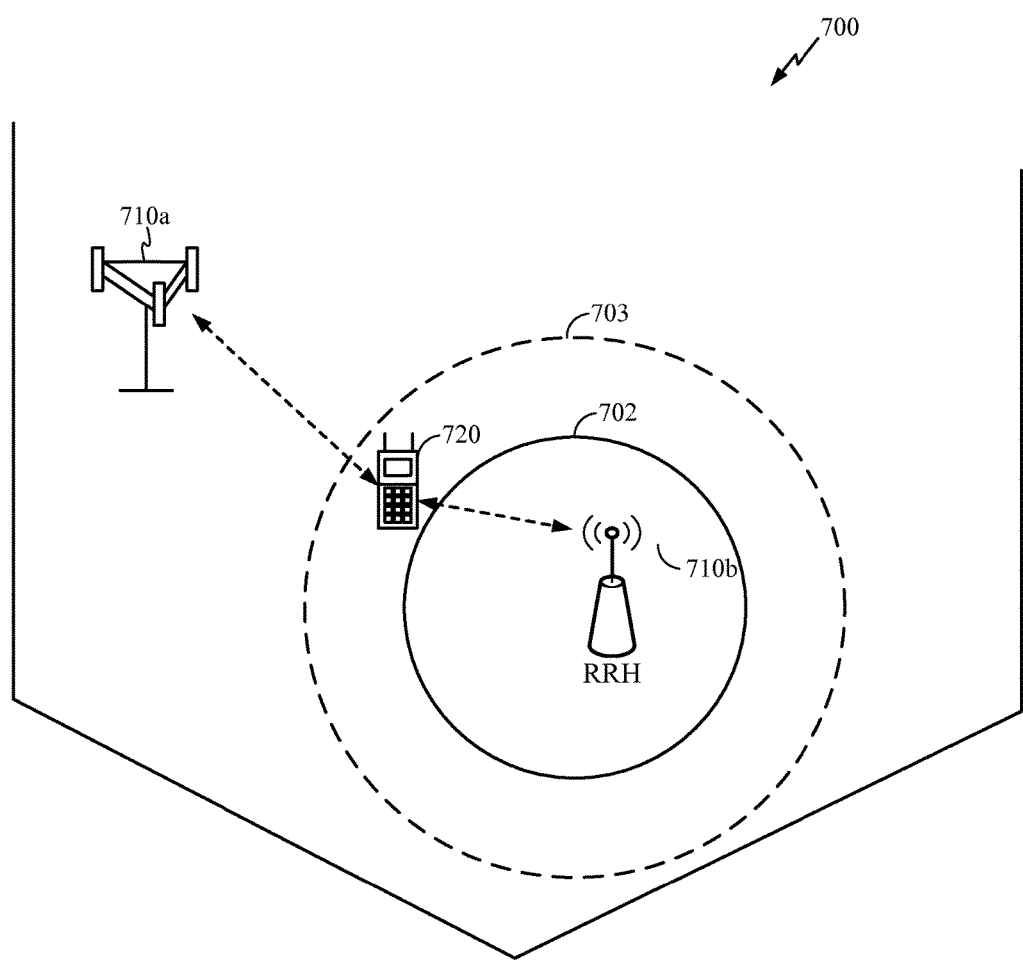
FIG. 7 is a diagram illustrating a range expanded cellular region in a heterogeneous network.

FIG. 7 is a diagram $700$ illustrating a range expanded cellular region in a heterogeneous network. A lower power class eNB such as the RRH $710b$ may have a range expanded cellular region $703$ that is expanded from the cellular region $702$ through enhanced inter-cell interference coordination between the RRH $710b$ and the macro eNB $710a$ and through interference cancelation performed by the UE $720$. In enhanced inter-cell interference coordination, the RRH $710b$ receives information from the macro eNB $710a$ regarding an interference condition of the UE $720$. The information allows the RRH $710b$ to serve the UE $720$ in the range expanded cellular region $703$ and to accept a handoff of the UE $720$ from the macro eNB $710a$ as the UE $720$ enters the range expanded cellular region $703$.

Figure 8:
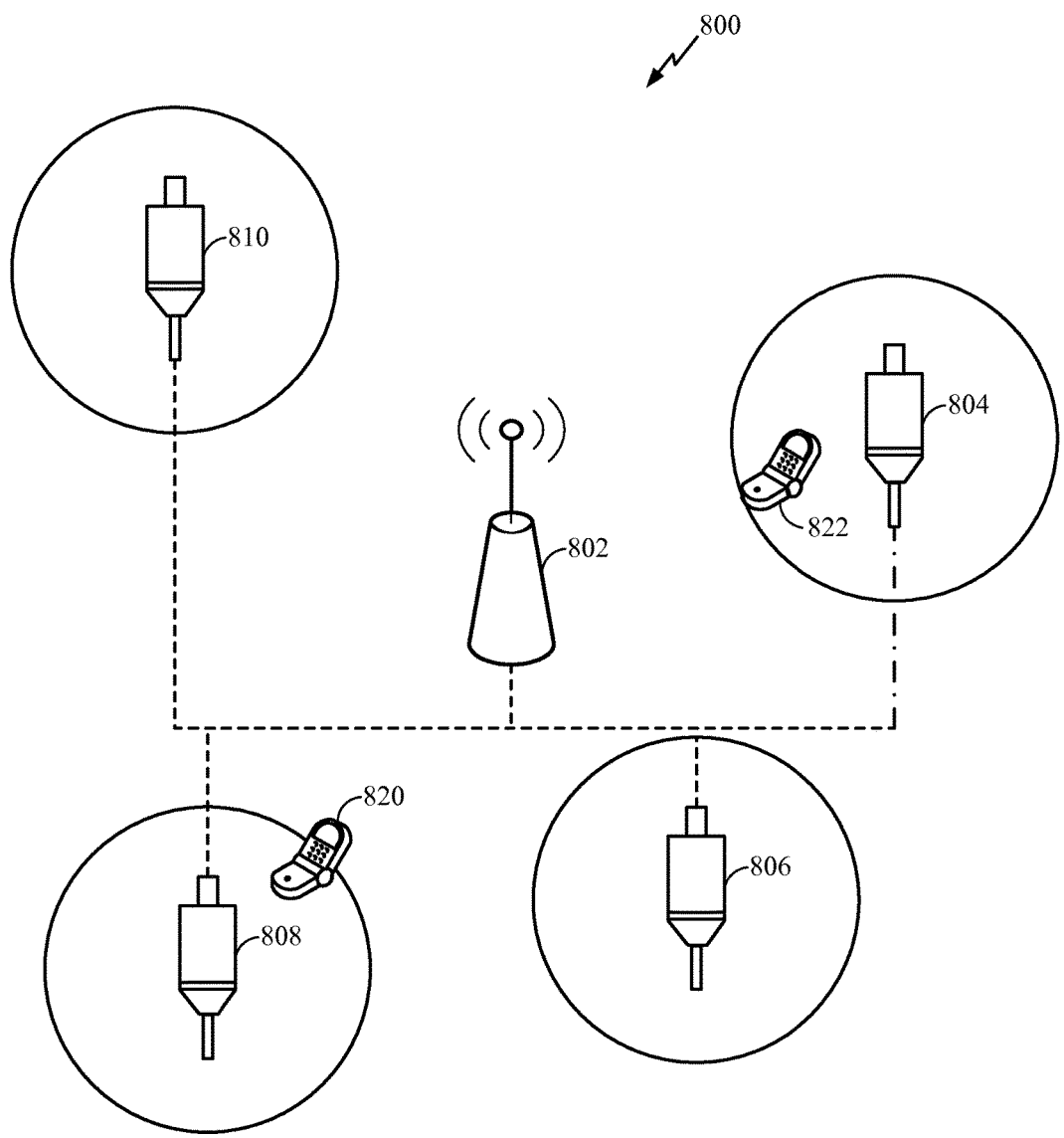
FIG. 8 is a diagram illustrating a network with a macro eNB and remote radio heads (RRHs) in accordance with certain aspects of the present disclosure.

FIG. 8 is a diagram illustrating a network $800$, which includes a macro node and a number of remote radio heads (RRHs) in accordance with certain aspects of the present disclosure. The macro node $802$ is connected to RRHs $804$, $806$, $808$, and $810$ with optical fiber. In certain aspects, network 800 may be a homogeneous network or a heterogeneous network and the RRHs 804-810 may be low power or high power RRHs. In an aspect, the macro node 802 handles all scheduling within the cell, for itself and the RRHs. The RRHs may be configured with the same cell identifier (ID) as the macro node 802 or with different cell IDs. If the RRHs are configured with the same cell ID, the macro node 802 and the RRHs may operate as essentially one cell controlled by the macro node 802. On the other hand, if the RRHs and the macro node 802 are configured with different cell IDs, the macro node 802 and the RRHs may appear to a UE as different cells, though all control and scheduling may still remain with the macro node 802. It should further be appreciated that the processing for the macro node 802 and the RRHs 804, 806, 808, 810 may not necessarily have to reside at the macro node. It may also be performed in a centralized fashion at some other network device or entity that is connected with the macro and the RRHs.

As used herein, the term transmission/reception point ("TxP") generally refers geographically separated transmission/reception nodes controlled by at least one central entity (e.g., eNodeB), which may have the same or different cell IDs.

In certain aspects, when each of the RRHs share the same cell ID with the macro node 802, control information may be transmitted using CRS from the macro node 802 or both the macro node 802 and all of the RRHs. The CRS is typically transmitted from each of the transmission points using the same resource elements, and therefore the signals collide. When each of the transmission points has the same cell ID, CRS transmitted from each of the transmission points may not be differentiated. In certain aspects, when the RRHs have different cell IDs, the CRS transmitted from each of the TxPs using the same resource elements may or may not collide. Even in the case, when the RRHs have different cell IDs and the CRS collide, advanced UEs may differentiate CRS transmitted from each of the TxPs using interference cancellation techniques and advanced receiver processing.

In certain aspects, when all transmission points are configured with the same cell ID and CRS is transmitted from all transmission points, proper antenna virtualization is needed if there are an unequal number of physical antennas at the transmitting macro node and/or RRHs. That is, CRS is to be transmitted with an equal number of CRS antenna ports. For example, if the node 802 and the RRHs 804, 806, 808 each have four physical antennas and the RRH 810 has two physical antennas, a first antenna of the RRH 810 may be configured to transmit using two CRS ports and a second antenna of the RRH 810 may be configured to transmit using a different two CRS ports. Alternatively, for the same deployment, macro 802 and RRHs 804, 806, 808, may transmit only two CRS antenna ports from selected two out of the four transmit antennas per transmission point. Based on these examples, it should be appreciated that the number of antenna ports may be increased or decreased in relation to the number of physical antennas.

As discussed supra, when all transmission points are configured with the same cell ID, the macro node 802 and the RRHs 804-810 may all transmit CRS. However, if only the macro node 802 transmits CRS, outage may occur close to an RRH due to automatic gain control (AGC) issues. In such a scenario, CRS based transmission from the macro 802 may be received at low receive power while other transmissions originating from the close-by RRH may be received at much larger power. This power imbalance may lead to the aforementioned AGC issues.

In summary, typically, a difference between same/different cell ID setups relates to control and legacy issues and other potential operations relying on CRS. The scenario with different cell IDs, but colliding CRS configuration may have similarities with the same cell ID setup, which by definition has colliding CRS. The scenario with different cell IDs and colliding CRS typically has the advantage compared to the same cell ID case that system characteristics/components which depend on the cell ID (e.g., scrambling sequences, etc.) may be more easily differentiated.

The exemplary configurations are applicable to macro/RRH setups with same or different cell IDs. In the case of different cell IDs, CRS may be configured to be colliding, which may lead to a similar scenario as the same cell ID case but has the advantage that system characteristics which depend on the cell ID (e.g., scrambling sequences, etc.) may be more easily differentiated by the UE).

In certain aspects, an exemplary macro/RRH entity may provide for separation of control/data transmissions within the transmission points of this macro/RRH setup. When the cell ID is the same for each transmission point, the PDCCH may be transmitted with CRS from the macro node 802 or both the macro node 802 and the RRHs 804-810, while the PDSCH may be transmitted with channel state information reference signal (CSI-RS) and demodulation reference signal (DM-RS) from a subset of the transmission points. When the cell ID is different for some of the transmission points, PDCCH may be transmitted with CRS in each cell ID group. The CRS transmitted from each cell ID group may or may not collide. UEs may not differentiate CRS transmitted from multiple transmission points with the same cell ID, but may differentiate CRS transmitted from multiple transmission points with different cell IDs (e.g., using interference cancellation or similar techniques).

In certain aspects, in the case where all transmission points are configured with the same cell ID, the separation of control/data transmissions enables a UE transparent way of associating UEs with at least one transmission point for data transmission while transmitting control based on CRS transmissions from all the transmission points. This enables cell splitting for data transmission across different transmission points while leaving the control channel common. The term "association" above means the configuration of antenna ports for a specific UE for data transmission. This is different from the association that would be performed in the context of handover. Control may be transmitted based on CRS as discussed supra. Separating control and data may allow for a faster reconfiguration of the antenna ports that are used for a UE's data transmission compared to having to go through a handover process. In certain aspects, cross transmission point feedback may be possible by configuring a UE's antenna ports to correspond to the physical antennas of different transmission points.

In certain aspects, UE-specific reference signals enable this operation (e.g., in the context of LTE-A, Rel-10 and above). CSI-RS and DM-RS are the reference signals used in the LTE-A context. Interference estimation may be carried out based on or facilitated by CSI-RS muting. When control channels are common to all transmission points in the case of a same cell ID setup, there may be control capacity issues because PDCCH capacity may be limited. Control capacity may be enlarged by using FDM control channels. Relay PDCCH (R-PDCCH) or extensions thereof, such as an enhanced PDCCH (ePDCCH) may be used to supplement, augment, or replace the PDCCH control channel.

SRS Issues in CoMP Scenarios

In CoMP design, one challenging part is to identify and group transmission points participating in CoMP operations (into an UL and/or DL CoMP set) with minimum overhead. SRS channel is mainly used for UL channel sounding. In the context of CoMP, SRS is often used to identify the closest cell to the UE. The current LTE SRS channel in the Release 8-10 is designed without much consideration for CoMP operations. As a result, existing CoMP design may lead to either dimension limitation or design complexity for the various CoMP scenarios.

Aspects of the present disclosure provide techniques that may enhance sounding reference signal (SRS) procedures for use in coordinated multipoint (CoMP) systems. As will be described in greater detail below, a UE involved in CoMP operations may be configured to send two different sets of SRS signals. For example, a first set of SRS may be intended for a serving cell only, while the second set of SRS may be intended for the joint reception of multiple cells.

Sounding reference signals (SRS) are transmitted by a UE on the uplink and allow receiving nodes to estimate the quality of the channel at different frequencies. In a CoMP system, SRS may allow receiving nodes to determine a closest transmission point and, for example, dynamically switch transmission points that serve the UE on the uplink or downlink. The techniques presented herein may apply to both periodic SRS (e.g., SRS transmissions scheduled to be transmitted periodically) and aperiodic SRS (e.g., a single SRS transmission triggered by a downlink transmission).

The SRS is used by the base station to estimate the quality of the uplink channel for large bandwidths outside the assigned span to a specific UE. This measurement cannot be obtained with the demodulation reference signal (DRS) since these are always associated to the physical uplink shared channel (PUSCH) and physical uplink control channel (PUCCH) and limited to the UE allocated bandwidth. Unlike the DRS associated with the physical uplink control and shared channels the SRS is not necessarily transmitted together with any physical channel. If the SRS is transmitted with a physical channel then it may stretch over a larger frequency band. The information provided by the estimates is used to schedule uplink transmissions on resource blocks of good quality.

SRS is typically transmitted from a UE with a cell ID (e.g., a PCI of a serving cell) detectable by a give transmission point. As described herein, however, a UE may transmit two sets of SRS using different cell IDs.

A pico eNB may have its own physical cell identification (PCI), or cell ID, with an X2 connection with the macro eNB. The pico eNB has its own scheduler operation, and may link to multiple macro eNBs. An RRH may or may not have the same PCI as the macro eNB, and has a fiber connection with the macro eNB, providing better backhaul. For RRH, the scheduler operation can be performed only at the macro eNB side. A femto eNB may have restricted association, and has not been given much consideration in CoMP schemes.

The SRS techniques presented herein may be applied to a number of different downlink (DL) CoMP scenarios. For example, in a first scenario (Scenario 1), there may be a homogeneous deployment with intra-site CoMP. In a second scenario (Scenario 2), there may be a homogeneous deployment with high power RRH connected by fiber.

In a third scenario (Scenario 3), the macro eNB and RRH(s) and/or pico eNB(s) have different PCI. In this scenario, the common reference signal (CRS), primary synchronization signal (PSS), secondary synchronization signal (SSS), and physical broadcast channel (PBCH) are all transmitted from the macro eNB and pico eNBs. In this scenario, cell splitting gain can be easily achieved by scheduling different users to different RRHs, however, DL CoMP transmissions based on CSI-RS or CRS requires enhanced feedback from UE.

In a fourth scenario (Scenario 4), the macro eNB and RRH(s) have the same PCI. In one case, only the macro eNB transmits CRS, PSS, SSS, and PBCH, whereas in another, the macro eNB and RRH may both transmit CRS, PSS, SSS, and PBCH. For RRH with the same cell ID, the macro eNB and RRH effectively form a "super-cell" with centralized scheduling. Single frequency network (SFN) gain can be achieved, but not the cell splitting gain. The SRS channel can be used to identify the closest RRH, and based on this, one can do cell splitting by transmitting only from closed by RRHs to the UE.

In Scenario 3, with each RRH having a different PCIs, the SRS channel from each RRH will have a different configuration, sequence, etc. For both DL CoMP and uplink (UL) CoMP, each RRH would need to try SRS sent from other RRHs. Alternatively, in Scenario 4, with the RRHs having the same PCI, all RRHs will try to decode the same UE's SRS transmission. Depending on the received signal strength, DL and UL CoMP set can be formed. However the design difficulty is the dimension of SRS channels, i.e., more UEs may press the limit of the SRS channel.

As noted above, aspects of the present disclosure provide techniques that may enhance sounding reference signal (SRS) procedures for use in coordinated multipoint (CoMP) systems. According to techniques presented herein, a UE involved in CoMP operations may be configured to send two different sets of SRS signals. For example, a first set of SRS may be intended for a serving cell only, while the second set of SRS may be intended for the joint reception of multiple cells.

For example, one possible enhancement for Scenario 3 is for one eNB (macro eNB, RRH, pico eNB, or femto eNB, etc.) to allocate an SRS transmission with a PCI other than its own. This PCI can be a virtual or group PCI, which is signaled or exchanged through fiber or X2 connection among all participating nodes. All the nodes that can receive this SRS may participate in DL or UL CoMP with the UE. For non-CoMP operation, all of the nodes may receive SRS belonging to its own PCI. In addition, for DL or UL CoMP operation, each node may receive an SRS belonging to the virtual or group PCI.

Figure 9:
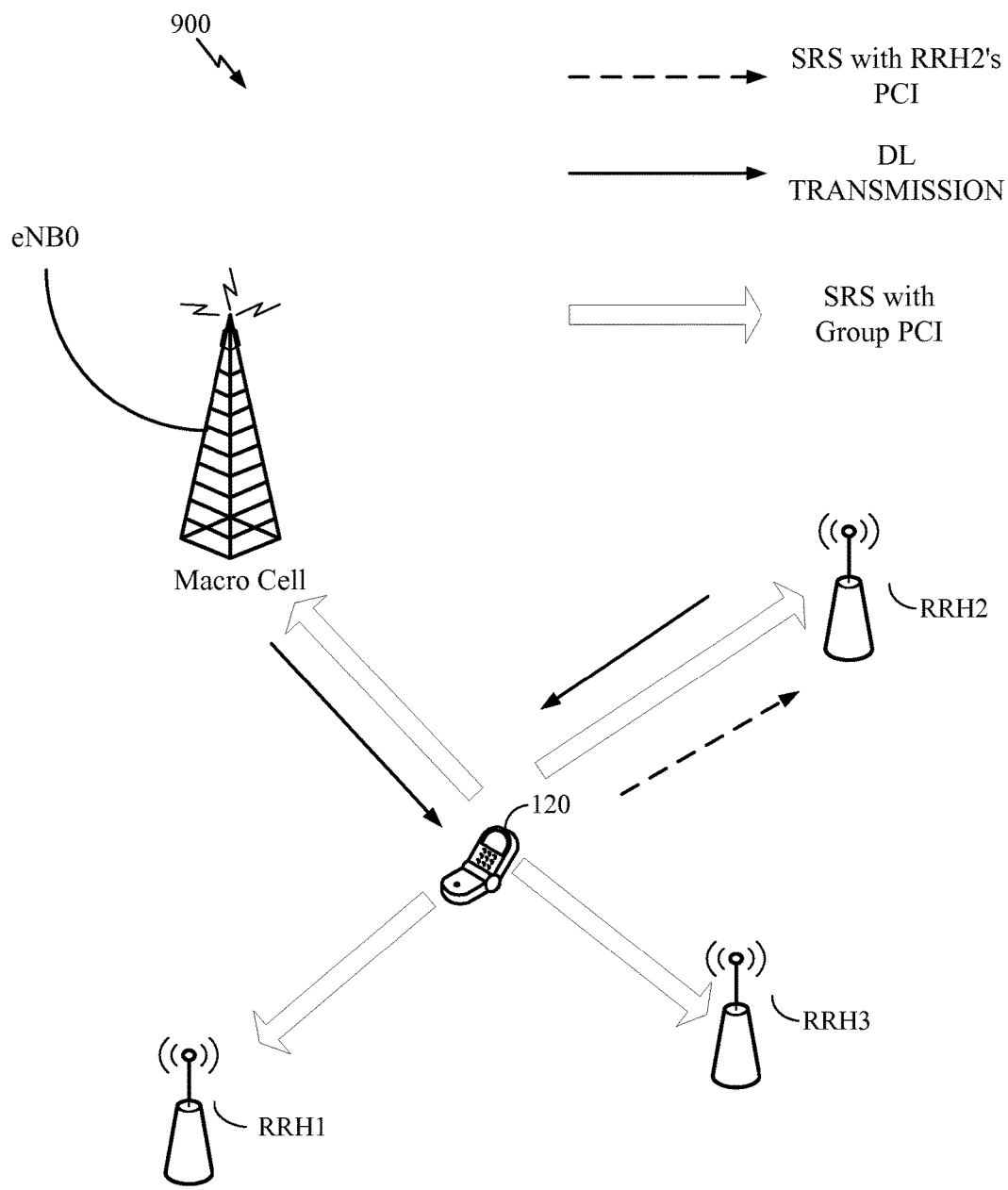
FIG. 9 is a diagram illustrating an example sounding reference signal (SRS) enhancement, in accordance with aspects of the present disclosure.

FIG. 9 illustrates one example of transmitting SRS with a group PCI. In the example, the UE is served by RRH2 for non-CoMP operation. As such, the UE sends a first SRS with the PCI of RRH2. However, the UE also sends SRS mapped to another PCI (designated a group PCI) for possible CoMP operation from RRH1, RRH2, RRH3, and the macro eNB.

Figure 10:
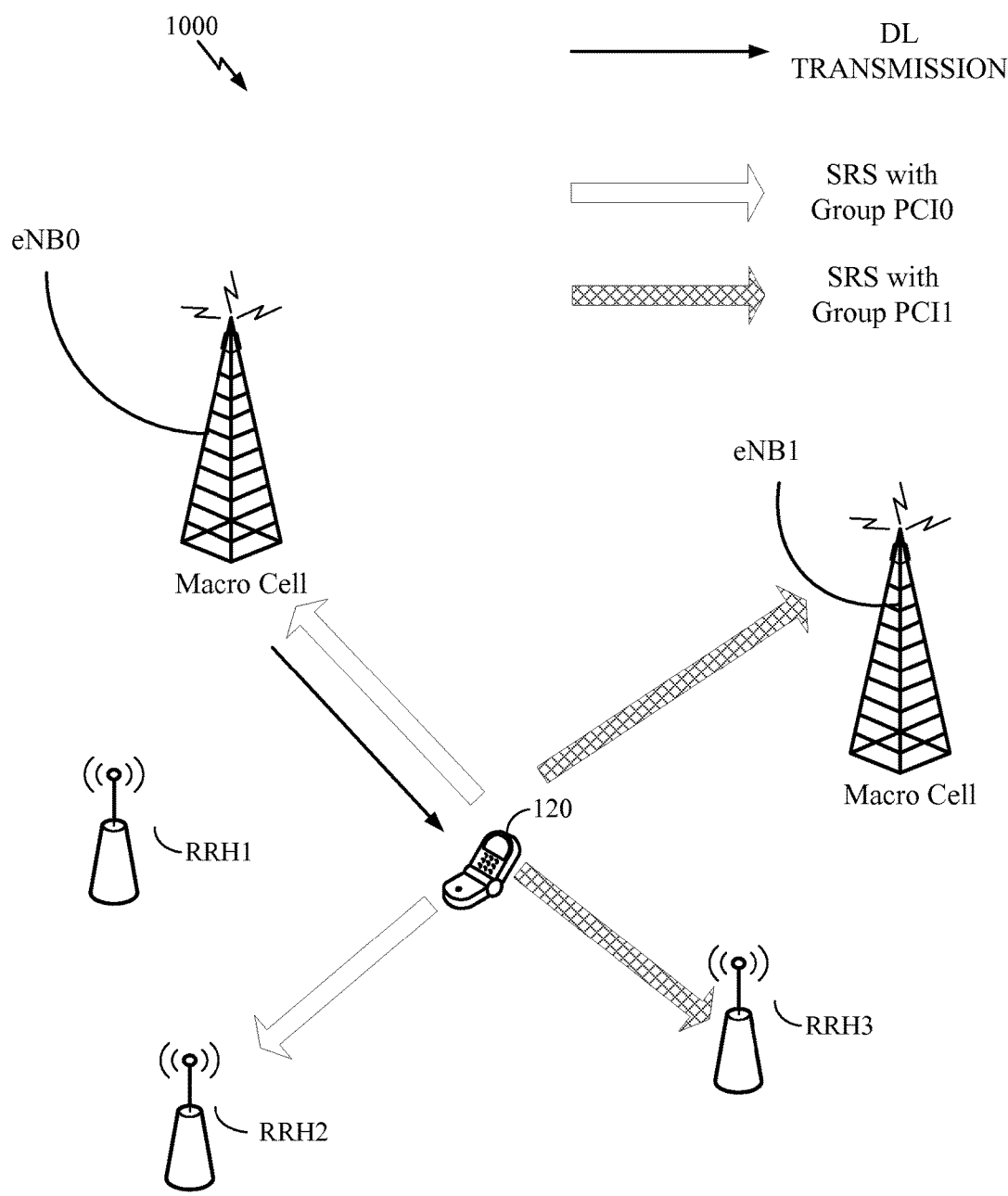
FIG. 10 is a diagram illustrating another example sounding reference signal (SRS) enhancement, in accordance with aspects of the present disclosure.

FIG. 10 illustrates another example of transmitting SRS with group PCI. The example illustrates a boundary situation in which UE is served by one eNB (eNB0), but is on the boundary between eNB0 and another macro eNB (eNB1). In this example, RRH2 has the same PCI as eNB0, and RRH3 has the same PCI as eNB1 (e.g., as is the case in Scenario 4). In this situation, UE can send the PCI of the neighboring node (PCI1) in addition to its own (PCI0). Macro eNB0 may schedule the UE to transmit SRS according to PCI0, as well as PCI1. Macros eNBs eNB1 and eNB0 can jointly transmit or receive for the UE.

Multiplexing for Different SRS with Separate Power Control

When a UE is configured for at least two SRS configurations, the different SRS may be multiplexed according to different techniques. For example, a UE may be configured to utilize time division multiplexing (TDM) to switch between the two SRS configurations. This TDM approach may have little or no impact on peak to average ratio and may, thus, be a preferred solution. Alternatively, a UE may be configured to transmit the two SRS configurations via frequency division multiplexing (FDM) with different cyclic shift or different comb, although this approach may increase peak to average ratio if both are transmitted in the same sub-frame.

For the TDM SRS transmission opportunities, one SRS may be intended for (transmission points of) the serving cell only. The other SRS may be intended for the joint reception of (transmission points of) multiple cells. According to certain aspects, two different power control schemes may be used for the different SRS configurations.

For example, a first power control scheme may be referred to as power control scheme A (PC_A) and may be used for SRS targeting multiple reception points (e.g., four transmission points as shown in FIG. 9) or a different reception point. A second power control scheme may be referred to as power control scheme B (PC_B) and may be used for SRS targeting a reception point in a single cell.

PC_A may result in the SRS targeting multiple cells being transmitted with a higher power offset relative to SRS targeting serving transmission points only. PC_A may also have outer loop power control enabled, and potentially separate transmit power control (TPC) commands from that of PUSCH and PUCCH may be used (meaning transmission power for SRS does not need to be tied directly to transmission power commands for PUSCH and PUCCH).

PC_B power control scheme, targeting the serving reception point or points (e.g., RRH2 in the example shown in FIG. 9) may utilize a different power offset than PC_A power control scheme. In this case, the SRS can be transmitted with different power offset, outer power control loop may be disabled, and/or PC_B may use a different outer loop than PC_A, and the same TPC as PUSCH with a fixed power offset may be used.

The signaling impact of the enhancements described above is that eNB needs to signal UE multiple SRS configurations. Participating nodes need to exchange information for the common SRS configuration that is intended for DL CoMP or UL CoMP. There may also be additional signaling to support multiple power control levels for different SRS configurations, or alternatively, the delta offset among the different SRS configurations.

The impact on UE transmission is that a UE will have multiple SRS transmissions with different configurations (time, frequency, shift, and comb) and possibly different power offsets. The impact on eNB reception is that an eNB may receive SRS with multiple configurations from the same UE, and eNB can run multiple power control loops for different SRS.

In alternative embodiments, more than two SRS configurations may be used by the UE and/or eNBs and RRHs.

Figure 11:
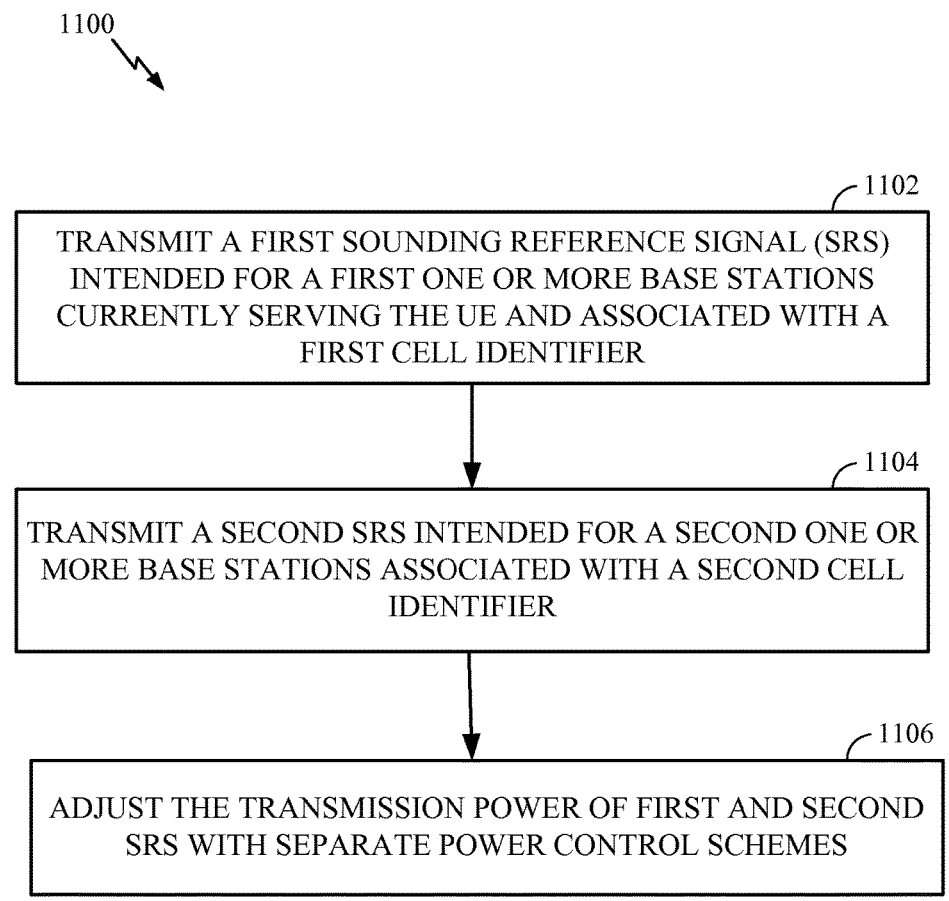
FIG. 11 illustrates example operations 1100, performed at a user equipment (UE), in accordance with certain aspects of the disclosure.

FIG. 11 illustrates example operations 1100, performed by a user equipment (UE), in accordance with aspects of the present disclosure. The operations 1100 begin, at 1102, with the UE transmitting a first sounding reference signal (SRS) intended for one or more base stations currently serving the UE and associated with a first cell identifier. At 1104, the UE transmits a second SRS intended for joint reception by one or a plurality of base stations associated with a second cell identifier. At 1106, the UE adjusts the transmission power of first and second SRS with separate power control schemes.

Figure 12:
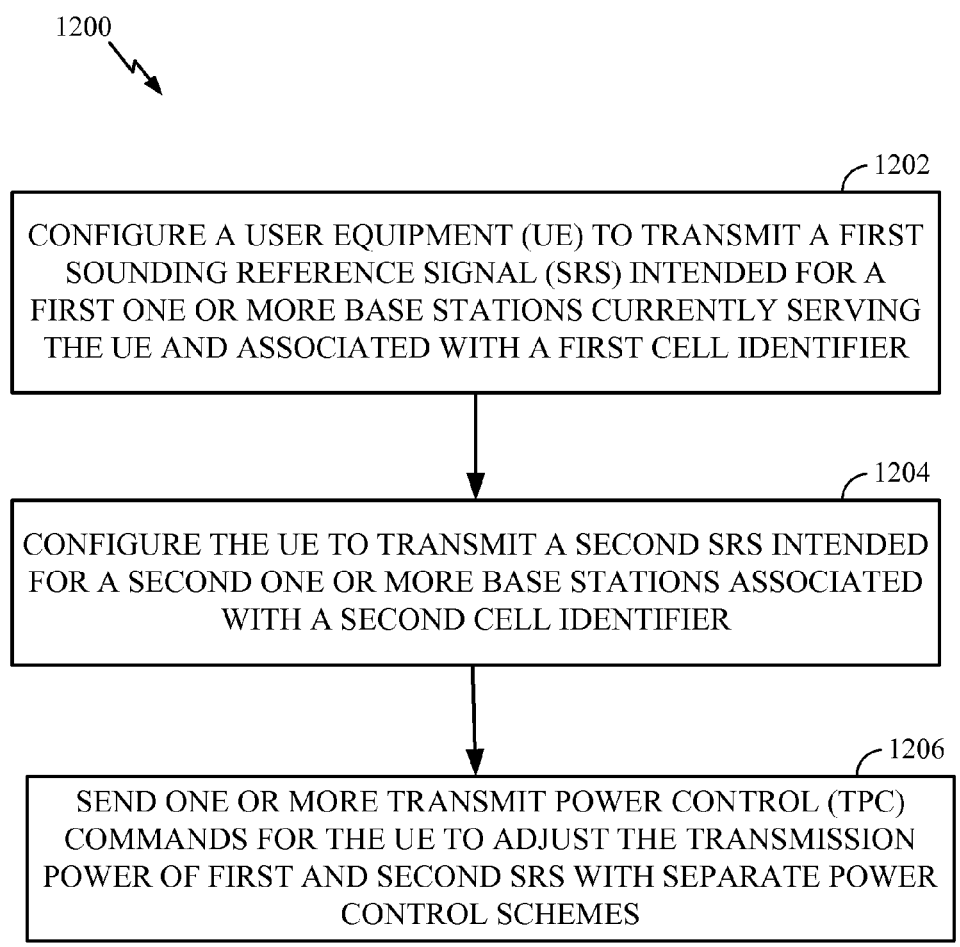
FIG. 12 illustrates example operations 1200, performed at a base station (e.g., and eNB), in accordance with certain aspects of the disclosure.

FIG. 12 illustrates example operations 1200, performed by a base station (BS), in accordance with aspects of the present disclosure. The operations 1200 begin, at 1202, with the BS configuring a user equipment (UE) to transmit a first sounding reference signal (SRS) intended for one or more base stations currently serving the UE and associated with a first cell identifier. At 1204, the BS configures the UE to transmit a second SRS intended for another or a plurality of base stations associated with a second cell identifier. At 1206, the BS sends one or more transmit power control (TPC) commands for the UE to adjust the transmission power of first and second SRS with separate power control schemes.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communication by a user equipment (UE), comprising:
    transmitting a first sounding reference signal (SRS) intended for a first one or more base stations currently serving the UE and associated with a first cell identifier;
    transmitting a second SRS intended for a second one or more base stations associated with a second cell identifier; and
    adjusting, a based on one or more transmit power control (TPC) commands, a transmission power of the first and the second SRS with different power control schemes.

2. The method of claim 1, wherein the UE is configured to transmit at least one of the first and second SRS periodically.

3. The method of claim 1, wherein the UE is configured to transmit at least one of the first and second SRS aperiodically.

4. The method of claim 1, wherein adjusting the transmission power of the first and the second SRS with different power control schemes comprises:
    adjusting the first SRS with a first power control scheme; and
    adjusting the second SRS with a second power control scheme, wherein the first power control scheme results in the first SRS being transmitted with a different power offset than the second SRS.

5. The method of claim 4, wherein the first power control scheme utilizes an outer power control loop with TPC commands from a base station.

6. The method of claim 5, wherein the second power control scheme does not utilize an outer power control loop.

7. The method of claim 5, wherein the TPC commands of the first power control scheme are different from TPC commands applied to physical uplink channels in which the first SRS is not transmitted.

8. The method of claim 1, wherein:
    the second cell identifier comprises a virtual cell identifier associated with a plurality of base stations participating in coordinated multipoint (CoMP) operations with the UE.

9. The method of claim 1, wherein the second cell identifier comprises a cell identifier associated with a neighboring cell.

10. A method for wireless communication by a first base station, comprising:
    configuring a user equipment (UE) to transmit a first sounding reference signal (SRS) intended for a first one or more base stations currently serving the UE and associated with a first cell identifier;
    configuring the UE to transmit a second SRS intended for a second one or more base stations associated with a second cell identifier; and
    sending one or more transmit power control (TPC) commands for the UE to adjust a transmission power of the first and the second SRS with different power control schemes.

11. The method of claim 10, wherein the UE is configured to transmit at least one of the first and second SRS periodically.

12. The method of claim 10, wherein the UE is configured to transmit at least one of the first and second SRS aperiodically.

13. The method of claim 10, wherein the one or more TPC commands comprise TPC commands utilized in an outer power control loop of a first power control scheme.

14. The method of claim 13, wherein the one or more TPC commands further comprise separate TPC commands utilized in an outer power control loop of a second power control scheme.

15. The method of claim 13, further comprising:
    transmitting TPC commands applied by the UE to adjust transmit power of one or more physical uplink channels in which the first SRS is not transmitted.

16. The method of claim 10, wherein:
    the second cell identifier comprises a virtual cell identifier associated with a plurality of base stations participating in coordinated multipoint (CoMP) operations with the UE.

17. The method of claim 10, wherein the second cell identifier comprises a cell identifier associated with a neighboring cell.

18. An apparatus for wireless communication by a user equipment (UE), comprising:
    means for transmitting a first sounding reference signal (SRS) intended for a first one or more base stations currently serving the UE and associated with a first cell identifier;

means for transmitting a second SRS intended for a second one or more base stations associated with a second cell identifier; and means for adjusting, based on one or more transmit power control (TPC) commands, a transmission power of the first and the second SRS with different power control schemes.

19. The apparatus of claim 18, wherein the UE is configured to transmit at least one of the first and second SRS periodically.

20. The apparatus of claim 18, wherein the UE is configured to transmit at least one of the first and second SRS aperiodically.

21. The apparatus of claim 18, wherein adjusting the transmission power of the first and the second SRS with different power control schemes comprises:

adjusting the first SRS with a first power control scheme; and adjusting the second SRS with a second power control scheme, wherein the first power control scheme results in the first SRS being transmitted with a power offset than the second SRS.

22. The apparatus of claim 21, wherein the first power control scheme utilizes an outer power control loop with TPC commands from a base station.

23. The apparatus of claim 22, wherein the second power control scheme does not utilize an outer power control loop.

24. The apparatus of claim 22, wherein the TPC commands of the first power control scheme are different from TPC commands applied to physical uplink channels in which the first SRS is not transmitted.

25. The apparatus of claim 18, wherein:
the second cell identifier comprises a virtual cell identifier associated with a plurality of base stations participating in coordinated multipoint (CoMP) operations with the UE.

26. The apparatus of claim 18, wherein the second cell identifier comprises a cell identifier associated with a neighboring cell.

27. An apparatus for wireless communication by a first base station, comprising:

means for configuring a user equipment (UE) to transmit a first sounding reference signal (SRS) intended for a first one or more base stations currently serving the UE and associated with a first cell identifier;

means for configuring the UE to transmit a second SRS intended for a second one or more base stations associated with a second cell identifier; and means for sending one or more transmit power control (TPC) commands for the UE to adjust a transmission power of the first and the second SRS with different power control schemes.

28. The apparatus of claim 27, wherein the UE is configured to transmit at least one of the first and second SRS periodically.

29. The apparatus of claim 27, wherein the UE is configured to transmit at least one of the first and second SRS aperiodically.

30. The apparatus of claim 27, wherein the one or more TPC commands comprise TPC commands utilized in an outer power control loop of a first power control scheme.

31. The apparatus of claim 30, wherein the one or more TPC commands further comprise separate TPC commands utilized in an outer power control loop of a second power control scheme.

32. The apparatus of claim 30, further comprising: means for transmitting TPC commands applied by the UE to adjust transmit power of one or more physical uplink channels in which the first SRS is not transmitted.

33. The apparatus of claim 27, wherein:
the second cell identifier comprises a virtual cell identifier associated with a plurality of base stations participating in coordinated multipoint (CoMP) operations with the UE.

34. The apparatus of claim 27, wherein the second cell identifier comprises a cell identifier associated with a neighboring cell.

35. An apparatus for wireless communication by a user equipment (UE), comprising:

at least one processor configured to transmit a first sounding reference signal (SRS) intended for a first one or more base stations currently serving the UE and associated with a first cell identifier, transmit a second SRS intended for a second one or more base stations associated with a second cell identifier, and adjust, based on one or more transmit power control (TPC) commands, a transmission power of the first and the second SRS with different power control schemes; and a memory coupled with the at least one processor.

36. An apparatus for wireless communication by a first base station, comprising:

at least one processor configured to configure a user equipment (UE) to transmit a first sounding reference signal (SRS) intended for a first one or more base stations currently serving the UE and associated with a first cell identifier, configure the UE to transmit a second SRS intended for a second one or more base stations associated with a second cell identifier, and send one or more transmit power control (TPC) commands for the UE to adjust a transmission power of the first and the second SRS with different power control schemes; and a memory coupled with the at least one processor.

37. A computer program product comprising a non-transitory computer readable medium having instructions stored thereon, the instructions executable by one or more processors for:

transmitting a first sounding reference signal (SRS) intended for a first one or more base stations currently serving a UE and associated with a first cell identifier;

transmitting a second SRS intended for a second one or more base stations associated with a second cell identifier; and adjusting, based on one or more transmit power control (TPC) commands, a transmission power of the first and the second SRS with different power control schemes.

38. A computer program product comprising a non-transitory computer readable medium having instructions stored thereon, the instructions executable by one or more processors for:

configuring a user equipment (UE) to transmit a first sounding reference signal (SRS) intended for a first one or more base stations currently serving the UE and associated with a first cell identifier;

configuring the UE to transmit a second SRS intended for a second one or more base stations associated with a second cell identifier; and sending one or more transmit power control (TPC) commands for the UE to adjust a transmission power of the first and the second SRS with different power control schemes.

* * * * *